United States Patent [19]

Ito et al.

[11] Patent Number: 5,270,539

[45] Date of Patent: Dec. 14, 1993

[54] METHOD AND APPARATUS FOR NON-CONTACT POSITION DETERMINATION USING VARIABLE WIDTH SLIT ARRAY AND LINEAR CCD SENSOR

[75] Inventors: Shinzo Ito, Aichi; Akihiro Daito, Kariya, both of Japan

[73] Assignee: Nippondenso Co., Ltd., Kariya, Japan

[21] Appl. No.: 793,728

[22] Filed: Nov. 20, 1991

[30] Foreign Application Priority Data

Nov. 21, 1990 [JP] Japan .................................. 2-319146

[51] Int. Cl.$^5$ .............................................. G01D 5/34
[52] U.S. Cl. ........................... 250/231.18; 250/237 G
[58] Field of Search ...................... 250/231.13, 231.18, 250/237 G, 561; 356/373–375

[56] References Cited

U.S. PATENT DOCUMENTS

| 4,950,891 | 8/1990 | Matsui | 250/237 G |
| 4,988,865 | 1/1991 | Schmidt et al. | 250/231.18 |
| 5,068,529 | 11/1991 | Ohno et al. | 250/231.18 |

FOREIGN PATENT DOCUMENTS

| 122884 | 4/1989 | Japan . |
| 123048 | 4/1989 | Japan . |
| 196512 | 4/1989 | Japan . |

*Primary Examiner*—David C. Nelms
*Assistant Examiner*—Stephone B. Allan
*Attorney, Agent, or Firm*—Cushman, Darby & Cushman

[57] ABSTRACT

For non-contact measurement of the quantity of movement, such as the quantity of injection from a car diesel injection pump, a slit plate having a plurality of slits different in shape from each other is provided so as to be movable in predetermined directions with the movement of a position detection target portion. A measurement wave is radiated toward the slit plate, and the presence of reception of the measurement wave passing through the slits is detected on a receiving surface wider than the width of the slits in a direction of movement. The distance between a reception boundary and an end portion of the receiving surface is measured. A slit through which the measurement wave is passing is specified. The relation of the quantity of movement of the reception boundary from a reference position is calculated for every slit in advance, and the quantity of movement from the reference position is detected on the basis of the measured distance of the reception boundary and the specified slit.

20 Claims, 3 Drawing Sheets

METHOD AND APPARATUS FOR NON-CONTACT POSITION DETERMINATION USING VARIABLE WIDTH SLIT ARRAY AND LINEAR CCD SENSOR

BACKGROUND OF THE INVENTION

The present invention relates to a non-contact movement quantity measurement method and an apparatus therefor, which can be used as a method and an apparatus for measuring fine and impulsive movement, for example, for measuring the quantity of injection of a car diesel injection pump.

Heretofore, the non-contact movement quantity measurement method is classified mainly into an increment type and an absolute type. A moved distance measurement apparatus of the increment type is disclosed in Japanese Patent Post examination publication No. Hei-1-23048. In the measurement apparatus, a slit plate is provided so as to be movable together with a subject to be measured. Light is radiated to the slit plate. The rays of light passed through slits of the slit plate is measured by a light detector so that the number of the passed rays of light is counted to thereby measure the quantity of movement of the slit plate, that is, the quantity of movement of the subject.

On the other hand, a moved distance measurement apparatus of the absolute type is disclosed in Japanese Patent Postexamination publication No. Hei-1-22884. In the measurement apparatus, coded slits are formed in a slit plate which moves together with a subject to be measured. Light is radiated to the slit plate. The rays of light passed through slits in the slit plate is detected by a light detector to thereby detect the position of a slit before the movement of the subject and the position of the slit after the movement of the subject. Distances from a reference position to the respective slits are measured and stored in advance. Accordingly, the quantity of movement of the slit plate can be detected by measuring the positions of the slits through which rays of light pass, after the movement of the slit plate.

The following problems arise in the aforementioned conventional moved distance measurement method and apparatus.

In the increment type, the number of slits passing through the light detector is measured by a counter. Accordingly in the case where the subject moves at a very high speed, the counter cannot follow the high-speed movement of the slits. There arises a problem that the quantity of movement cannot be measured accurately.

On the other hand, in the absolute type, there is no problem in the follow operation. However, not only a moving subject cannot be measured but the minimum measurable quantity of moved distance depends on the slit interval between respective slits formed in the slit plate. Accordingly, as the distance to be measured becomes smaller, it is necessary to make the slit interval narrower physically. There arises a problem that the measurement cannot be applied to the extent of a fine range.

SUMMARY OF THE INVENTION

An object of the present invention is therefore to provide a measurement method which can sufficiently follow the high-speed movement of a subject to be measured and can measure a moved distance to the extent of a fine range, and an apparatus for realizing the measurement method.

In addressing the foregoing object of the invention, a receiver having a receiving surface wider than the width of the slit in a direction of movement is provided to receive on the receiving surface a detection wave passing through slits from a sending source to thereby detect the reception of the detection wave on the receiving surface.

The distance from the reception boundary on the receiving surface to an end portion of the receiving surface is measured on the basis of the result of detection of the presence of reception of the detection wave. Further, a slit through which the detection wave passes is specified from the plurality of slits on the basis of the result of detection of the presence of reception of the detection wave.

The invention employs a method comprising the steps of: calculating the relation of the quantity of movement of the slit means from a reference position correspondingly to the distance between the reception boundary and the end portion of the receiving surface for each slit in advance; and measuring the quantity of movement of the slit means from the reference position on the basis of the measured distance between the reception boundary and the end portion of the receiving surface and the specified slit.

To achieve this method, the invention provides a non-contact movement quantity measurement apparatus which has: a slit plate being movable in predetermined directions correspondingly to the movement of a position detection target portion and having a plurality of slits different in shape; and a receiving means having a receiving surface wider than the width of the slits in a direction of movement, the receiving means for receiving on the receiving surface a measurement wave passing through the slits from the sending source and generating a detection signal indicating the presence of reception of the measurement wave on the receiving surface.

The apparatus further has: a position measuring means for measuring the distance between a reception boundary on the receiving surface and an end portion of the receiving surface in response to the reception signal received from the receiving means to thereby generate a measurement signal; and a slit detection means for specifying a slit through which the measurement wave passes from the plurality of slits in response to the reception signal received from the receiving means to thereby generate a slit specified signal.

The apparatus further has: a movement quantity detection means for detecting the quantity of movement of the slit means from a reference position by storing the distance measured by the position measuring means and the quantity of movement of the slit means for each slit in advance and receiving the measurement signal from the position measuring means and also receiving the slit specified signal from the slit detection means.

After the movement of a subject to be measured, the measurement wave from the sending source passes through slits so as to be received by the receiving means. In order to measure the position of the slit plate, a slit through which the measurement wave passes is specified, so that the distance between a position of reception of the measurement wave on the receiving surface of the receiving means and a reference position is detected. Because the reception position and the slit position for each slit are stored in advance, the position of the slit is measured automatically if the slit through which the measurement wave passes can be specified and the position of reception of the measurement wave can be detected.

DESCRIPTION OF THE PREFERRED EMBODIMENTS

An embodiment of the present invention in which the measurement method and the measurement apparatus are used for measuring the quantity of injection from a diesel injection pump will be described hereunder.

Figure 3:
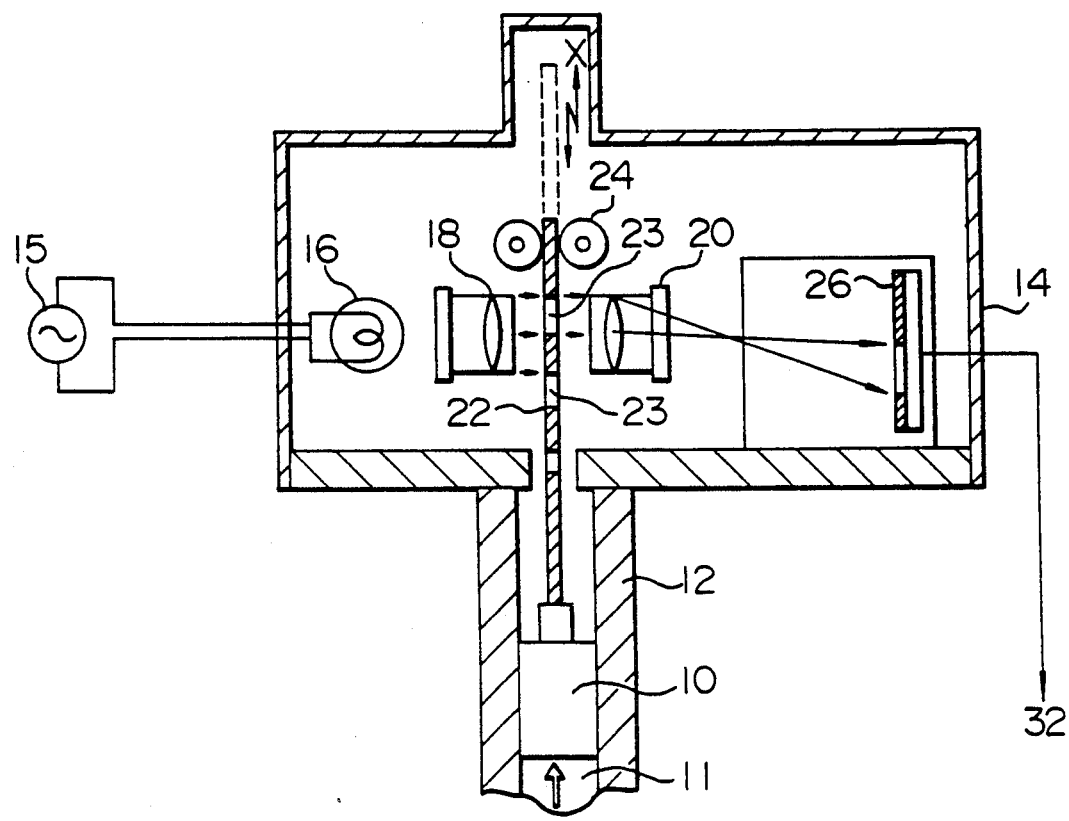
FIG. 3 is a sectional view showing an apparatus as an embodiment of the invention.

FIG. 3 is a sectional view showing an apparatus for measuring the quantity of injection from a diesel injection pump. The schematic construction of the apparatus will be described with reference to the drawing. In a cylindrical guide 12, a piston 10 is arranged so as to be slidable while keeping liquid-tightness. Liquid from the diesel injection pump is injected into a cylindrical space 11 defined by the guide 12 and the piston 10 so that the piston 10 is moved up in the direction of the arrow of FIG. 3 correspondingly to the quantity of the injected liquid.

A slit plate 22 having a plurality of slits 23 is fixed to the upper end of the piston 10. With the motion of the piston 10, the slit plate 22 reciprocates in the directions of the arrows X of FIG. 3. A pair of guide rollers 24 is arranged on the upper end side of the slit plate 22 so that the slit plate 22 is pinched by the pair of guide rollers 24 so as not only to prevent the slit plate 22 from rotating but to guide the reciprocation of the slit plate 22.

A lamp 16 which serves as a signal generation source is disposed on one side of the slit plate 22. The lamp 16 is electrically connected to an electric source 15 so that the lamp 16 sends out light equivalent to a measurement wave. A projector lens 18 is arranged between the lamp 16 and the slit plate 22 to collimate the rays diverged from the lamp 16 into parallel rays. A condenser lens 20 is arranged on the side opposite to the projector lens 18 with respect to the slit plate 22 to condense the rays coming through the slits 23 from the lamp 16. Further, a line sensor 26 is arranged to receive the rays. The line sensor 26 is constituted by a plurality of light-detection elements such as CCD elements. Light-detection signals generated by the light-detection elements are transferred to an amplifier which will be described later.

All the lamp 16, the projector lens 18, the condenser lens 10, the slit plate 22 and the line sensor 26 are housed within a housing 14 which has such a structure that outside light cannot come into the housing 14.

Figure 1:
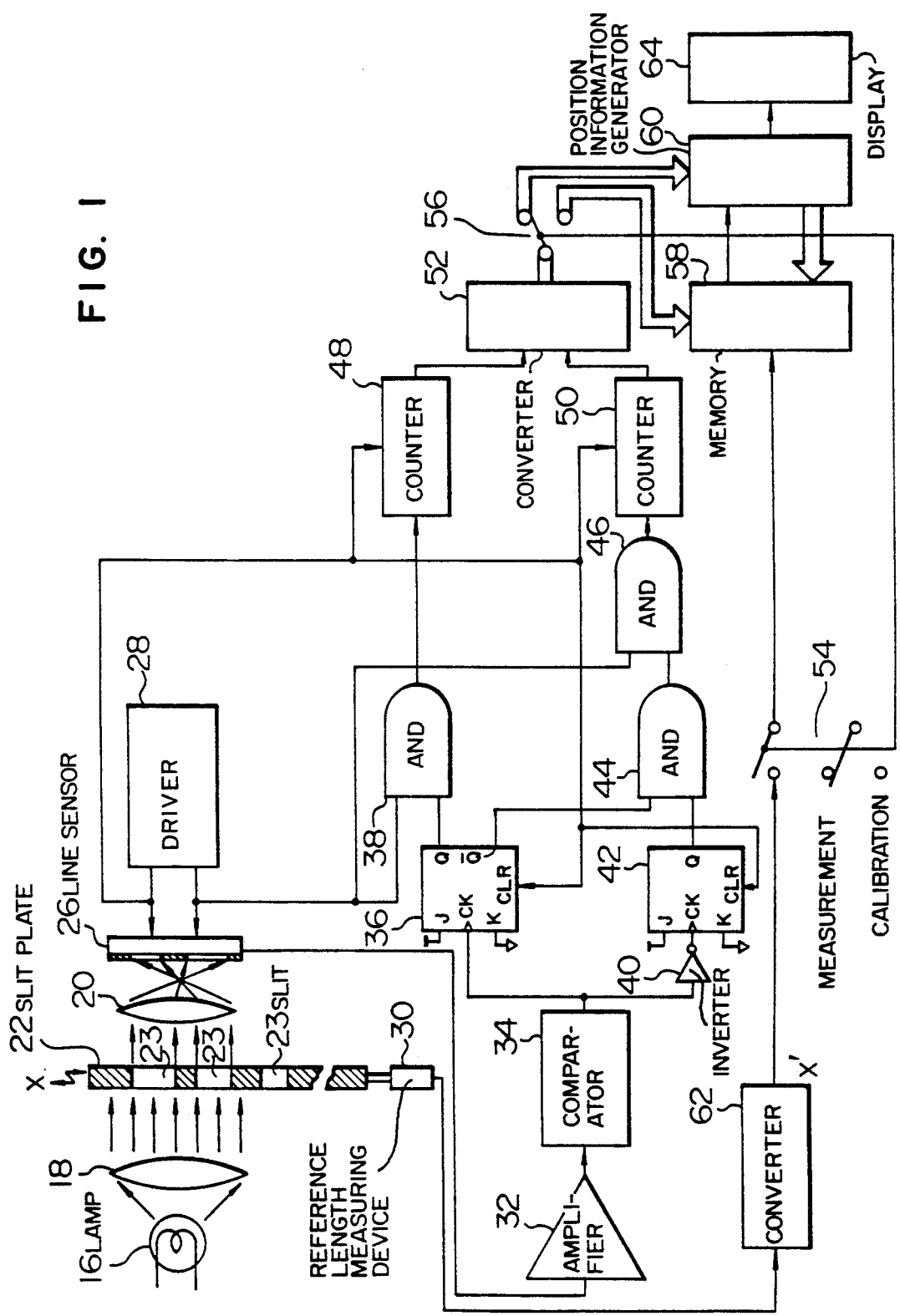
FIG. 1 is a circuit diagram showing an embodiment of the present invention.

FIG. 1 is a diagram showing a circuit for processing the light-detection signals obtained by the line sensor 26.

A driving circuit 28 is electrically connected to the line sensor 26. The driving circuit 28 sends out a start signal to order the line sensor 26 to start, an end signal to order the line sensor 26 to end, and clock pulses. The output side of the line sensor 26 is connected to the amplifier 32 for amplifying a line sensor output. The output side of the amplifier 32 is connected to a comparator 34 for comparing the signal amplified by the amplifier 32 with a reference value to thereby convert the signal into a digital signal "1" or "0".

The comparator 34 is connected to a first flip-flop circuit 36 directly and to a second flip-flop circuit 42 through an inverter 40. The J input terminal of the first flip-flop circuit 36 is always set to "1", and the K input terminal thereof is always set to "0". The CK input terminal of the first flip-flop circuit 36 receives the digital signal from the comparator 34. The Q output terminal of the first flip-flop circuit 36 is connected to a first AND circuit 38, and Q output terminal of the same is connected to a second AND circuit 44. The CLR terminal of the first flip-flop circuit 36 receives the end signal from the driving circuit 28.

The inverter 40 inverts the state, "0" or "1" of the digital signal received from the comparator 34. The signal thus inverted is inputted into the second flip-flop circuit 42. The J input terminal of the second flip-flop circuit 42 is always set to "1", and the K input terminal of the same is always set to "0". The Q output terminal of the second flip-flop circuit 42 is connected to the second AND circuit 44. The CLR terminal of the second flip-flop circuit 42 receives the end signal from the driving circuit 28.

The first AND circuit 38 receives the clock pulse signal from the driving circuit 28, so that an AND signal obtained by ANDing the clock pulse signal and the output signal from the Q output terminal of the first flip-flop circuit 36 is inputted into a first counter 48.

The output signal from the second AND circuit 44 is supplied to a third AND circuit 46. The third AND circuit 46 also receives the clock pulse signal from the driving circuit 28. As a result, an AND signal obtained by ANDing the two signals is sent to a second counter 50.

The first and second counters 48 and 50 start the measurement of the number of pulses in the input signal in response to the start signal received from the driving circuit 28 and end the measurement in response to the end signal. The measurement result y of the first counter 48 and the measurement result z of the second counter 50 are supplied to a converter 52 to generate an address (y,z) in the converter 52. This address (y,z) is passed through a switch 56 so as to be supplied to a data memory means 58 in the case of calibration of the measurement equipment, or so as to be supplied to a position information generation means 60 in the case of measurement of the quantity of movement.

When the measurement equipment is to be calibrated, a reference length measuring device 30 is connected to the lower end of the slit plate 22. The reference length measuring device 30 is constituted by an increment type optical sensor for detecting the quantity of movement of the slit plate 22 from a reference position. The detection signal is supplied to a converter 62 so as to be converted into a real movement quantity x. The movement quantity x is supplied to the data memory means 58 so as to be combined with the measurement results y and z obtained simultaneously, as reference data (x,y,z) to be stored in the data memory means 58. When the calibration of the measurement equipment is finished through the process as described above, the reference length measuring device 30 is removed and then the slit plate 22 is connected to the piston 10 as described above with reference to FIG. 3. A switch 54 is arranged between the converter 62 and the data memory means 58, so that the converter 62 and the data memory means 58 can be connected to each other at the time of the calibration and the two can be disconnected from each other at the time of the measurement. The switches 56 and 54 are linked to each other.

On the basis of the (y,z) information received from the converter 52, the position information generation means 60 retrieves a corresponding movement quantity x from the data stored in the data memory means 58 to thereby display the movement quantity x by means of a display means 64 such as a cathode ray tube (CRT) or the like.

The operation of the apparatus and the measurement method will be described hereunder with reference to the waveform diagram of FIG. 2.

Calibration is made to make the data memory means 58 store the reference data (x,y,z). The method of the calibration will be described later. When the calibration is finished, the slit plate 22 is connected to the piston 10. Liquid such as fuel is injected from the diesel injection pump (not shown) into the cylindrical space 11 in the guide 12. By the injection of liquid, the piston 10 is moved up in FIG. 4 so that the slit plate 22 is moved up.

The lamp 16 receives power supply from the electric source 15 so as to emit light the rays of which are then collimated into parallel rays by means of the projector lens. The collimated rays pass through the slits 23. The rays passed through the slits 23 are condensed by the condenser lens 20. The condensed rays are radiated onto the light-detection surface of the line sensor 26.

The line sensor 26 receives the start signal S from the driving circuit 28 and generates a signal (represented by the waveform A in FIG. 2) corresponding to the light intensity detected by light-detection elements arranged on the light-detection surface. This signal is amplified by the amplifier 32 and then compared with a threshold L by the comparator 34 to thereby be converted into a digital signal "0" or "1" (the waveform B in FIG. 2). The thus converted digital signal is inputted into the first flip-flop circuit 36. The J and K input terminals of the first flip-flop circuit 36 are always set to "1" and "0" respectively. Accordingly, while the signal from the comparator 34 is in a "0"-state, a "1"-state signal is outputted from the Q output terminal of the first flip-flop circuit 36. When a "1"-state signal is received from the comparator 34, a "0"-state signal is outputted from the Q output terminal (the waveform C in FIG. 2).

Figure 2:
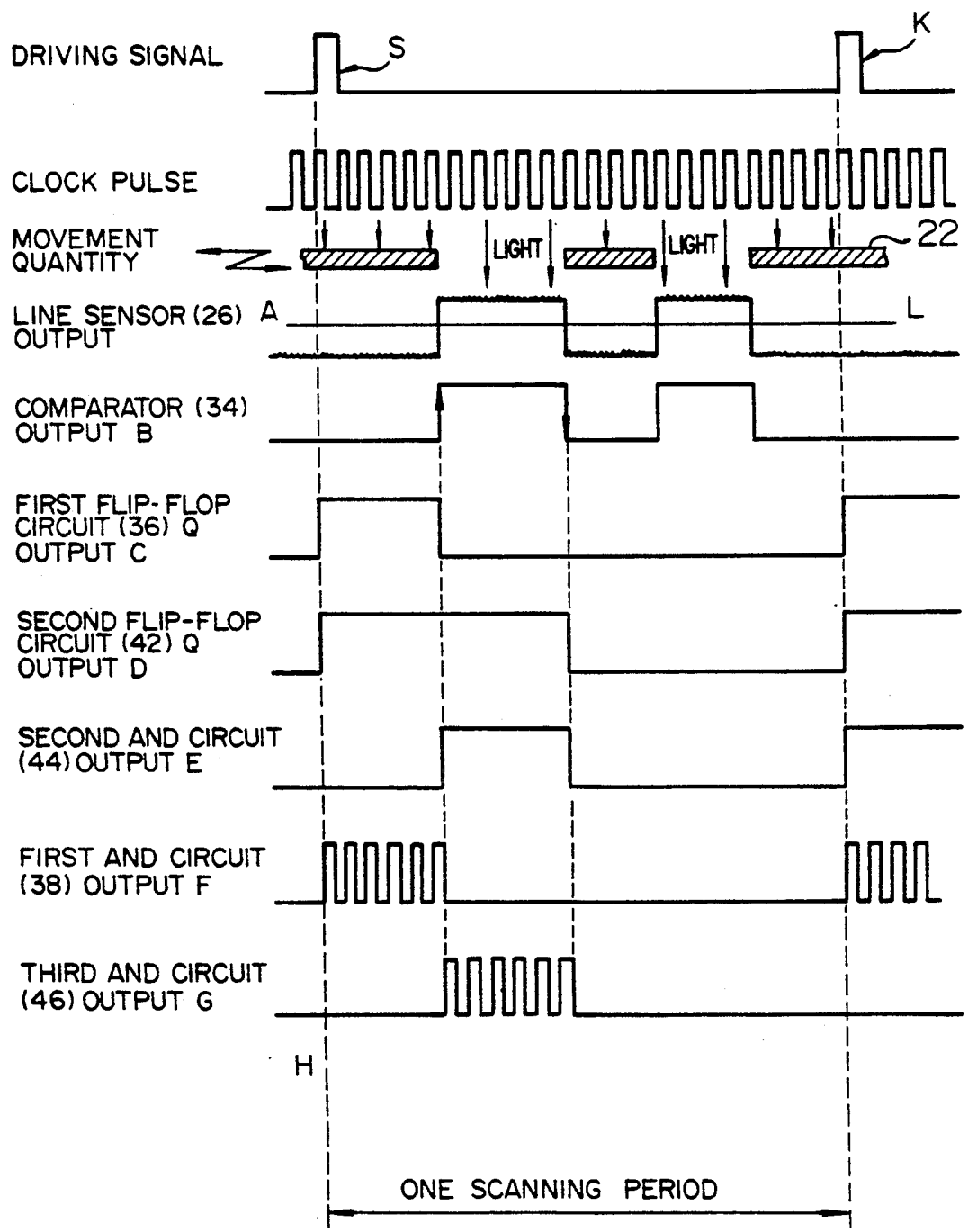
FIG. 2 is a waveform diagram showing output signals from respective devices.

The first AND circuit 38 receives the signal from the Q output terminal of the first flip-flop circuit 36 and receives also the clock pulse signal from the driving circuit 28, so that the first AND circuit 38 outputs clock pulses in a period where the signal from the Q output terminal is "1" (the waveform F in FIG. 2). The number of the clock pulses outputted from the first AND circuit 38 is counted by the first counter 48. The counted value y corresponds to the distance between the reference position H (in this embodiment, the outermost portion of the light-detection surface) on the light-detection surface of the line sensor 26 and the edge portion of the first slit 23.

The first flip-flop circuit 36 outputs from its $\overline{Q}$ output terminal a signal which is an inverted one of the output signal from its Q output terminal. On the other hand, the second flip-flop circuit 42 outputs from its Q terminal a "1"-state signal (the waveform D) before the state of the output signal from the comparator 34 turns from "1" to "0". Receiving the signal from the $\overline{Q}$ output terminal of the first flip-flop circuit 36 and receiving the signal from the Q output terminal of the second flip-flop circuit 42, the second AND circuit 44 outputs a signal corresponding to the width of a slit 23 (the waveform E in FIG. 2). Because the respective slits 23 are made to be different in width, a slit 23 through which light passes currently can be specified by the width of the slit 23.

Receiving the output signal from the second AND circuit 44 and receiving the clock pulse signal from the driving circuit 28, the third AND circuit 46 outputs clock pulses corresponding to the width of the slit 23 (the waveform G in FIG. 2). The number of the clock pulses is counted by the second counter 50.

Both the counted value y of the first counter 48 and the counted value z of the second counter 50 are supplied to the converter 52 so that an address (y,z) is generated in the converter 52. This address is read by the position information generation means 60, and the slit plate movement quantity x corresponding to the address is read from the reference data stored in the data memory means 58. The movement quantity x is displayed by the display means 62. The quantity of injection from the diesel injection pump can be found by measuring the movement quantity of the slit plate 22, that is, by measuring the movement quantity of the piston 10.

When the aforementioned measurement is finished once, the end signal K is generated from the driving circuit 28 and supplied to the CLR terminals of the first and second flip-flop circuits 36 and 42. As a result, the outputs from the two flip-flop circuits are initialized. Further, the end signal K is sent to the first and second counters, so that the two counters terminate the counting of the number of pulses.

A calibration method in which reference data are stored in the data memory means 58 will be described hereunder.

The reference length measuring device 30 is connected to the lower end of the slit plate 22. The slit plate 22 is moved at intervals of a fine distance by means of a micrometer or the like. Whenever the slit plate 22 is moved by the fine distance, the position of the slit plate 22 is measured by the reference length measuring device 30. The value of the position is converted into the real movement quantity x from the reference position by the converter 62. At the same time, the counted values y and z are obtained by the aforementioned counting method to store a value of the movement quantity x corresponding to the counted values y and z in the data memory means 58. As a result, reference data x, y and z are generated. At the time of the calibration, the switch 54 is operated to connect the converter 62 and the data memory means 58 to each other and the switch 56 is operated to connect the converter 52 and the data memory means 58 to each other.

Figure 4:
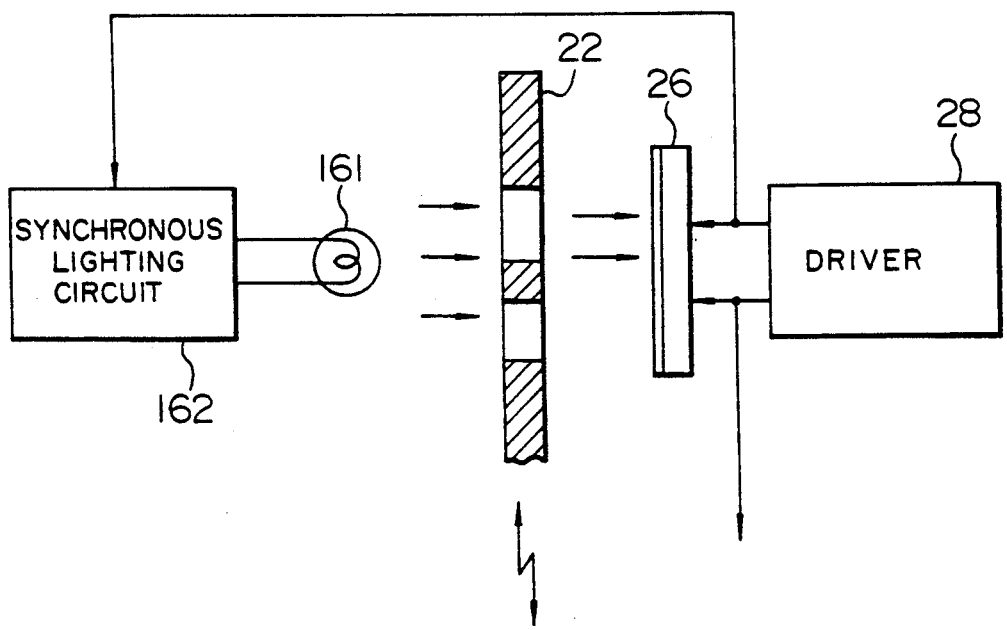
FIG. 4 is a sectional view showing an apparatus as another embodiment of the invention.

Although the aforementioned embodiment has shown the case where the lamp 16 is used, the invention can be applied to the case where a stroboscopic light source 161 is used as shown in FIG. 4. In this case, a start signal from the driving circuit 28 is supplied to a synchronous lighting circuit 162 to turn on the stroboscopic light source for a lighting time of 1.1 micro seconds.

Displacement in high-speed movement can be measured by using the aforementioned stroboscopic light source 161. When, for example, the stroboscopic lighting with a stroboscopic lighting time of 1 micro seconds and the charge accumulation time of the CCD are synchronized with each other, there arises an effect that movement of 1 MHz can be picked up.

Although the aforementioned embodiment has shown the case where rays of light are used as the measurement wave, the invention can be applied to the case where lines of magnetic force are used instead of rays of light.

In the aforementioned measurement method and apparatus, measurement accuracy can be improved to the extent of the resolving power of the line sensor. In this embodiment, measurement with resolving power of 0.6 microns can be made. Further, because the movement quantity after the completion of the movement of the slit plate is measured, there is no influence on the measurement of the movement quantity even if the slit plate moves impulsively.

As described above, according to the measurement method and apparatus of the present invention, not only the high-speed movement of a subject to be measured can be followed but the moved distance can be measured to an extent of a fine range.

What is claimed is:

1. A method of measuring movement of an object, comprising the steps of:
   providing a slit plate having a plurality of slits of different opening areas so as to be movable in predetermined directions to follow movement of said object;
   directing a measurement radiation ray from a radiation source to illuminate a receiver through any one of said slits of said slit plate;
   receiving the radiation ray through any one of said slits of said movable slit plate on said receiver, said receiver having a ray receiving surface, each slit and said receiving surface being positionally adjusted to enable the measurement ray passing through any one of said slits to scan on a portion of said surface in said predetermined directions, the width of said surface in said predetermined directions being wider than that of a possible illumination area of the radiation ray impinging upon said surface, said receiving surface having a plurality of radiation ray detecting elements for outputting signals responsive to a received radiation ray, said signals being representative of an opening area size of the slit through which the rays passes and a distance of movement thereof;
   measuring a distance from a boundary of an illumination area of the radiation ray impinging upon said detecting elements through an optional one of said slits to an end portion of said receiving surface, said measuring of the distance from said boundary to an end portion of said receiving surface being made on the basis of corresponding distance representative output signals of said detecting elements;
   identifying said one slit through which the radiation ray is passing, among said plurality of slits, on the basis of corresponding opening area size representative output signals of said detecting elements;
   making and storing in advance a corresponding relationship between data indicative of a distance of movement of each slit from a reference position and a distance from the boundary of the illumination area of a representative radiation ray to said end portion of said receiving surface; and
   detecting a position of said object optionally moved with said slit plate with respect to said reference position by collating data of the corresponding measured distance and the identified slit with said stored data relationship.

2. A method according to claim 1, wherein said radiation source includes a magnetic force source for emitting magnetic force, and said signal receiving means includes a magnetic sensor.

3. A method according to claim 1, wherein said signal receiving step includes a substep of waveform shaping an intensity signal of a detection wave received on said receiving surface into a digital signal by comparing the intensity signal with a reference value.

4. A method according to claim 1, wherein said radiation source includes a light source for emitting light, and said signal receiving means includes an optical sensor.

5. A method according to claim 4, further comprising a step of collimating rays of light emitted from said light source into parallel rays.

6. A method of according to claim 4, wherein said light source includes a stroboscopic light source for emitting light at a predetermined interval.

7. The method of claim 1, wherein:
   said measuring step comprises a first counting step of counting said distance representative output signals, each of said distance representative output signals corresponding to one of said radiation ray detecting elements not receiving said radiation ray; and
   said identifying step comprises a second counting step of counting said opening area size representative output signals.

8. A non-contact movement quantity measurement apparatus according to claim 7, wherein said signal receiving means includes a waveform shaping means for shaping an intensity signal of a detection wave received on said receiving surface into a digital signal by comparing the intensity signal with a reference value.

9. A non-contact movement quantity measurement apparatus according to claim 7, wherein said radiation source includes a magnetic force source for emitting magnetic force, and said signal receiving means includes a magnetic sensor.

10. The method of claim 7, further comprising a step of:
    issuing a start signal to cause said radiation ray detecting elements to output said distance representative output signals and said opening size representative output signals; wherein
    said first counting step counts only a group of said distance representative output signals occurring after said start signal but before a first group of said opening area size representative output signals; and
    said second counting step counts only said first group of opening area size representative output signals, said first group of opening area size representative output signals occurring before a second group of distance representative output signals.

11. The method of claim 10, said method further comprising the steps of:
    generating a first output signal from a first flip-flop responsive to said start signal;
    generating a second output signal from said first flip-flop responsive to a leading edge of said first group of opening area size representative output signals;
    generating a first output signal from a second flip-flop responsive to said start signal;
    generating a second output signal from said flip-flop responsive to a trailing edge of said first group of opening area size representative output signals;

wherein said first counting step is performed responsive to said second output signal of said first flip-flop; and said second counting step is performed responsive to a combination of said first output signal of said first flip-flop and said second output signal of said second flip-flop.

12. A non-contact movement quantity measurement apparatus according to claim 7, wherein said radiation source includes a light source for emitting light, and said signal receiving means includes an optical sensor.

13. A non-contact movement quantity measurement apparatus according to claim 12, further comprising a projector lens for collimating rays of light emitted from said light source into parallel rays.

14. A non-contact movement quantity measurement apparatus according to claim 12, wherein said light source includes a stroboscopic light source for emitting light at a predetermined interval.

15. An apparatus for measuring movement of an object, comprising:
   a slit plate having a plurality of slits of different opening areas, said slit plate being disposed so as to be movable in predetermined directions to follow movement of said object;
   radiation source means for generating and directing a measurement radiation ray through any one of said slits of said slit plate;
   signal receiving means for receiving the radiation ray passing through any one of said slits of said movable slit plate, said signal receiving means having a ray receiving surface, each slit and said receiving surface being positionally adjusted to enable the measurement ray passing through any one of said slits to illuminate a portion of said surface in said predetermined directions, the width of said surface in said predetermined directions being wider than that of a possible illumination area of the radiation ray impinging upon said surface, said receiving surface having a plurality of radiation ray detecting elements for outputting signals responsive to a received radiation ray, said signals being representative of an opening area size of the slit through which the rays passes and a distance of movement thereof;
   position measuring means for measuring a distance from a boundary of an illumination area of the radiation ray impinging upon said detecting elements through an optional one of said slits to an end portion of said receiving surface, said measuring of the distance from said boundary to an end portion of said receiving surface being made on the basis of corresponding distance representative output signals of said detecting elements;
   slit detection means for identifying said one slit through which the radiation ray is passing, among said plurality of slits, on the basis of corresponding opening area size representative output signals of said detecting elements;
   collation data storage means for making and storing in advance a corresponding relationship between data indicative of a distance of movement of each slit from a reference position and a distance from the boundary of the illumination area of a representative radiation ray to said end portion of said receiving surface; and
   movement quantity detection means for detecting a position of said object optionally moved with said slit plate with respect to said reference position by collating data of the corresponding measured distance and the identified slit with data from said collation data storage means.

16. The apparatus of claim 15, wherein:
said measuring means comprises first counting means for counting said distance representative output signals, each of said distance representative output signals corresponding to one of said radiation ray detecting elements not receiving said radiation ray; and said identifying means comprises second counting means for counting said opening area size representative output signals.

17. The apparatus of claim 16, wherein:
said apparatus further comprises receiver driving means for issuing a start signal to cause said radiation ray detecting elements to output said distance representative output signals and said opening size representative output signals;

said measuring means is further for counting only a group of said distance representative output signals occurring after said start signal but before a first group of said opening area size representative output signals; and said identifying means is further for counting only said first group of opening area size representative output signals, said first group of opening area size representative output signals occurring before a second group of distance representative output signals.

18. The apparatus of claim 17, said apparatus further comprising:
first flip-flop means responsive to said radiation ray detecting element output signals for generating a first output signal responsive to said start signal and for generating a second output signal responsive to a leading edge of said first group of opening area size representative output signals; and second flip-flop means responsive to said radiation ray detecting element output signals for generating a first output signal responsive to said start signal and for generating a second output signal responsive to a trailing edge of said first group of opening area size representative output signals;

wherein said first counting means is further for counting said distance representative output signals responsive to said second output signal of said first flip-flop means; and said second counting means is further for counting said opening area size representative output signals responsive to a combination of said first output signal of said first flip-flop means and said second output signal of said second flip-flop means.

19. The apparatus of claim 18, wherein:
said first flip-flop means is a J-K flip-flop having its J input at a potential substantially equal to said opening area size representative output signals, its K input at a potential substantially equal to said distance representative output signals, and its clock input responsive to said radiation ray detecting element output signals;

said second flip-flop means is a J-K flip-flop having its J input at a potential substantially equal to said opening area size representative output signals, its K input at a potential substantially equal to said distance representative output signals, and its clock input responsive to an inverted version of said radiation ray detecting element output signals;

said first counting means comprises a first AND gate having an input responsive to said start signal and an input responsive to a Q output of said first J-K flip-flop and a first counter having a clock input connected to an output of said first AND gate; and said second counting means comprises a second AND gate having an input connected to a Q output of said first J-K flip-flop and an input connected to a Q output of said second J-K flip-flop, a third AND gate having an input responsive to said start signal and an input connected to an output of said second AND gate, and a second counter having a clock input connected to an output of said third AND gate.

20. The apparatus of claim 19, wherein said receiver driving means is further for issuing an end signal for resetting said first and second J-K flip-flops and said first and second counters.

* * * * *